(12) United States Patent
Calahan

(10) Patent No.: US 7,653,636 B2
(45) Date of Patent: *Jan. 26, 2010

(54) SYSTEMS AND METHODS FOR STREAMING XPATH QUERY

(75) Inventor: Patrick Calahan, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/780,299

(22) Filed: Feb. 17, 2004

(65) Prior Publication Data

US 2004/0172599 A1 Sep. 2, 2004

Related U.S. Application Data

(60) Provisional application No. 60/451,313, filed on Feb. 28, 2003.

(51) Int. Cl.
*G06F 17/30* (2006.01)

(52) U.S. Cl. ........................... 707/100; 707/10

(58) Field of Classification Search ................ 707/100, 707/3, 10, 1, 104.1; 715/513, 514, 515, 516
See application file for complete search history.

(56) References Cited

U.S. PATENT DOCUMENTS

| | | | | |
|---|---|---|---|---|
| 6,125,391 | A | 9/2000 | Meltzer et al. ............... 709/223 |
| 6,226,675 | B1 | 5/2001 | Meltzer et al. ............... 709/223 |
| 6,286,064 | B1* | 9/2001 | King et al. ..................... 710/67 |
| 6,519,617 | B1 | 2/2003 | Wanderski et al. .......... 715/513 |
| 6,621,505 | B1* | 9/2003 | Beauchamp et al. ........ 715/764 |
| 6,684,204 | B1* | 1/2004 | Lal ................................ 707/3 |
| 6,901,410 | B2* | 5/2005 | Marron et al. ........... 707/104.1 |
| 6,941,557 | B1* | 9/2005 | Jakobson et al. ............ 719/316 |
| 2002/0103829 | A1* | 8/2002 | Manning et al. ............. 707/513 |
| 2002/0143815 | A1* | 10/2002 | Sather ......................... 707/513 |
| 2002/1016180 | * | 10/2002 | Hind et al. ................... 707/513 |
| 2002/0184065 | A1* | 12/2002 | Menard et al. .................. 705/7 |
| 2003/0018832 | A1 | 1/2003 | Amirisetty et al. |
| 2003/0065874 | A1* | 4/2003 | Marron et al. ............... 711/100 |
| 2003/0217094 | A1* | 11/2003 | Andrews et al. ............. 709/201 |
| 2003/0221168 | A1* | 11/2003 | Kozlov ........................ 715/513 |
| 2004/0028212 | A1* | 2/2004 | Lok et al. ............... 379/265.09 |

(Continued)

OTHER PUBLICATIONS

Desai et al. "introduction to Sequential XPath", XML Conference & Exposition 2001, Dec. 9-14, 2001.*

(Continued)

*Primary Examiner*—Baoquoc N To
(74) *Attorney, Agent, or Firm*—Fliesler Meyer LLP

(57) ABSTRACT

An improved XML query system represents an XML document as a stream of discrete 'events,' with each event representing a portion of the document as the document is being parsed. Expression-based event matching such as XPath can be performed against the event stream using a stack to keep only the relevant contexts in memory. Observers can be used to listen for matching events. Matching events can then be routed for processing by appropriate objects or components and returned to the event stream if necessary.

This description is not intended to be a complete description of, or limit the scope of, the invention. Other features, aspects, and objects of the invention can be obtained from a review of the specification, the figures, and the claims.

35 Claims, 3 Drawing Sheets

U.S. PATENT DOCUMENTS

2004/0103373 A1* 5/2004 Wei .......................... 715/513
2004/0167864 A1* 8/2004 Wang et al. .................... 707/1

OTHER PUBLICATIONS

Cover, Early Access Release of Java Architecture for XML Binding (JAXB), Jun. 14, 2001, p. 1-2.

Jeckle, "DaimlerChrysler", Jun. 28, 2001, pp. 1-44.

Cerami, "Web Services Essentials", 2001, pp. 1-32.

Curley "Converting Java and CORBA Components to a WS Reprentation", Feb. 6, 2002, pp. 1-12.

Desai, A., "Introduction to Sequential XPath", XML Conference & Exposition 2001, Dec. 9-14, 2001, Walt Disney World Dolphin Hotel, Orlando, FL, Paper—8 pages; http://www.idealliance.org/papers/xml2001/papers/html/05-01-01.html; http://www.idealliance.org/papers/xml2001/papers/speakers/asp; http:/web.archive.org/web/*/http://www.idealliance.org/papers/xml2001/papers/speakers.asp.

Desai, A., "Introduction to Sequential XPath", XML Conference & Exposition 2001, Dec. 9-14, 2001, Orlando, FL, PowerPoint presentation—16 pages (pdf).

Abraham, "TopXML", Feb. 11, 2002, pp. 1-4.

Cover Pages Hosted by Oasis, "Sun Microsystems Announces Java Architecture for XML Binding Beta Implementation", Oct. 24, 2002, pp. 1-5.

* cited by examiner

SYSTEMS AND METHODS FOR STREAMING XPATH QUERY

CLAIM OF PRIORITY

This application claims priority from the following application, which is hereby incorporated by reference in its entirety:

U.S. Provisional Application No. 60/451,313, entitled SYSTEMS AND METHODS FOR STREAMING XPATH QUERY, by Patrick Calahan, filed on Feb. 28, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference in its entirety:

U.S. patent application Ser. No. 10/304,207 entitled "Streaming Parser API," by Chris Fry et al., filed Nov. 26, 2002.

FIELD OF THE INVENTION

The present invention relates to the querying of data, such as from a document or file.

BACKGROUND

XPath is a W3C language standard that can be used to address or query parts of an XML document. It models an XML document as a tree of nodes, which can include element nodes, attribute nodes and/or text nodes. XPath can be used to identify a subset of an XML document by matching, or determining whether a node matches a pattern, similar to how SQL can be used against a database. In the typical case, an expression written in the XPath language is evaluated against an XML document to determine which parts of the document 'match' the XPath. In order to do this, the XML document must be parsed and represented in memory. One of the standard representations of XML is the Document Object Model (DOM). DOM model presents an XML document as a hierarchy of nodes through which one can navigate arbitrarily. This approach provides a lot of flexibility, but comes at a cost in terms of efficiency and memory use, as the entire document must be brought into memory at one time.

DETAILED DESCRIPTION

Figure 1:
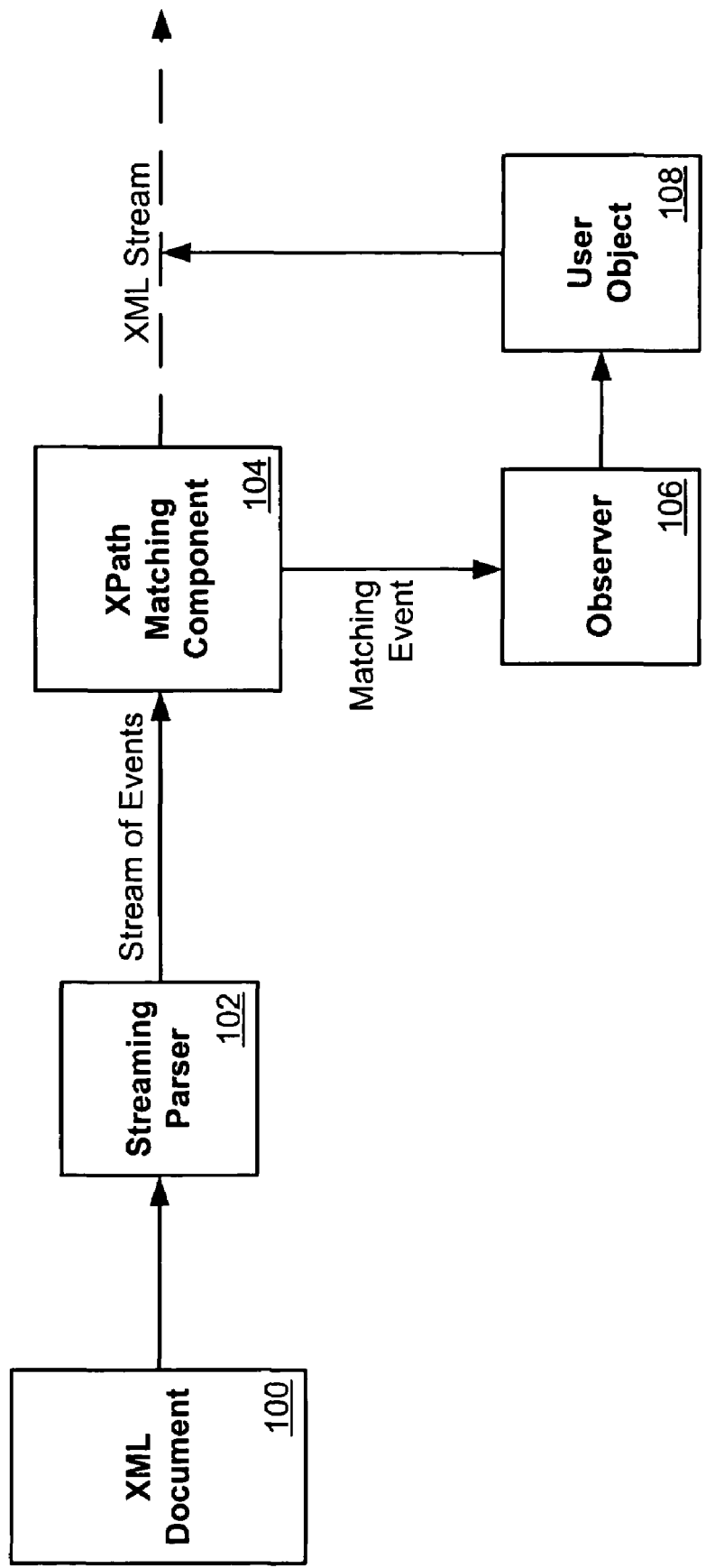
FIG. 1 is a diagram showing an exemplary system that can be used in accordance with one embodiment of the present invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with one embodiment of the present invention overcome deficiencies in existing XML query systems by representing the XML document as a stream of discrete 'events', with each event representing a portion of the document as the document is being parsed. Event matching can be performed against the event stream. Matching events can then be routed for processing by appropriate objects or components and returned to the event stream if necessary.

XPath can be used to identify a subset of an XML document, similar to how SQL can be used against a database. XPath is a W3C language standard that can be used to address or query parts of an XML document. It can address parts of an XML document by providing basic facilities for manipulating strings, numbers, and Boolean variables. XPath operates on the hierarchical structure, which can be but is not limited to a tree, instead of the syntax of an XML document and can be used for matching, or determining whether a node matches a pattern. It models an XML document as a tree of nodes, which can include element nodes, attribute nodes and/or text nodes and defines a way to compute a string-value for each node type. The primary syntactic construct in XPath is the expression. An expression is evaluated to yield an object of type node-set, Boolean, number, or string. In the typical case, an expression written in the XPath language is evaluated against an XML document to determine which parts of the document 'match' the XPath. In order to do this, the XML document must be parsed and represented in memory.

Systems and methods in accordance with one embodiment of the present invention adopt a true streaming approach, passing bits of an XML document one after another, and it is up to the system to decide what to do with each bit as it passes on the stream. An advantage of a true streaming approach is that such a system is faster and far more memory efficient than a DOM-style approach, since only one portion of the document is in memory at any given time. When using a streaming parser, a system can take a stream on an XML document, generating a stream of events, one event for each node in the XML tree, and perform XPath matching on that stream. A streaming XPath system can also be schema aware, such that the system knows the XML schema for a document, that schema can be used to provide insight on how to most effectively process the document. For instance, the need to go "backwards" in a stream can be avoided if the system knows in advance which events it needs to grab and in what order those events will be received.

A streaming approach can place a greater burden on a system to maintain relevant state than a DOM approach, as a streaming approach may provide no navigation mechanisms. While such an approach provides a very efficient way to process an XML document, the efficiency comes at a cost, as there can be considerably less context available when working with a stream than when working with a DOM tree. Further, XPath has to be able to traverse the hierarchy, in some sense, in order to locate the appropriate portion of the document. In many instances, it is simple to locate an appropriate portion of XML against a DOM tree, since the system is able to walk against the tree. When using a stream, a system has to maintain context in a way that is efficient enough to make using the stream worthwhile. Some tradeoffs can be made, such as not supporting the entire XPath specification. At some point, it may be more efficient to realize an entire DOM tree, if doing a convoluted matching against the entire document.

The XPath specification defines the notion of a context, where a context is the information about an event, consisting of a node it represents, a position of the node relative to a parent node, and a function library, as well as any of several other components such as variable bindings. A location path is a type of expression that can select a set of nodes relative to the context node. The evaluation of a location path expression can result in the node-set containing the nodes being selected by the location path. Location paths can recursively contain expressions used to filter node sets. Expressions can be parsed by first dividing the character string to be parsed into tokens, then parsing the resulting token sequence.

In one embodiment, it is relatively easy to map context to the stream, as the system can maintain a stack of stream events that provide the direct ancestral line back to the root. For instance, matching an XPath that consists solely of child axes can be straightforward. In another embodiment, mapping can become more complicated in the case of descendant axes, similar to matching an entire sub-tree. In those cases, it can be necessary to spawn a tree of contexts and perform matching against each of those contexts. It can become complicated, as the system gets to maintain, and know when you can discard those cloned contexts. It can be even more complicated when matching axes called "following," which match everything below a certain point in the document. In some cases, it is necessary to maintain that context tree and track what to add on to the tree as the system navigates its way back out of the document.

Systems and methods in accordance with one embodiment of the present invention know how to manage the multi-context mode discussed in the proceeding paragraph. They utilize the information of contexts in the stack matching against the expression to recognize when to go into this multi-context mode, when to destroy those contexts, and how to update the context stack appropriately. Certain optimizations can also be used that can know when not to match certain contexts in the context tree. XPath defines different ways to slice up a document, such as parents and children, that each has to be dealt with in a different way.

Figure 2:
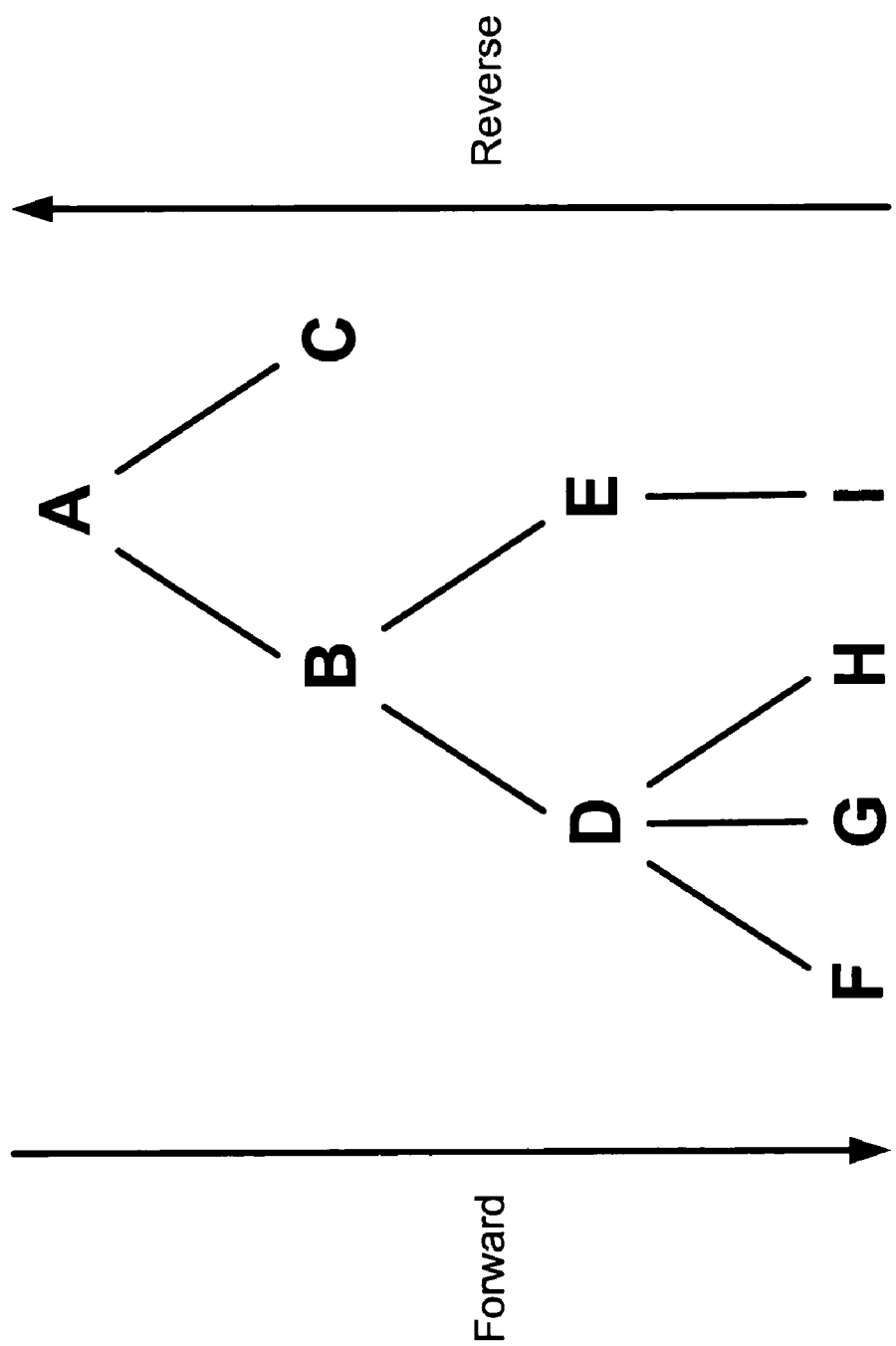
FIG. 2 shows an exemplary data tree that can be used with the system of FIG. 1 in an embodiment.
Figure 3:
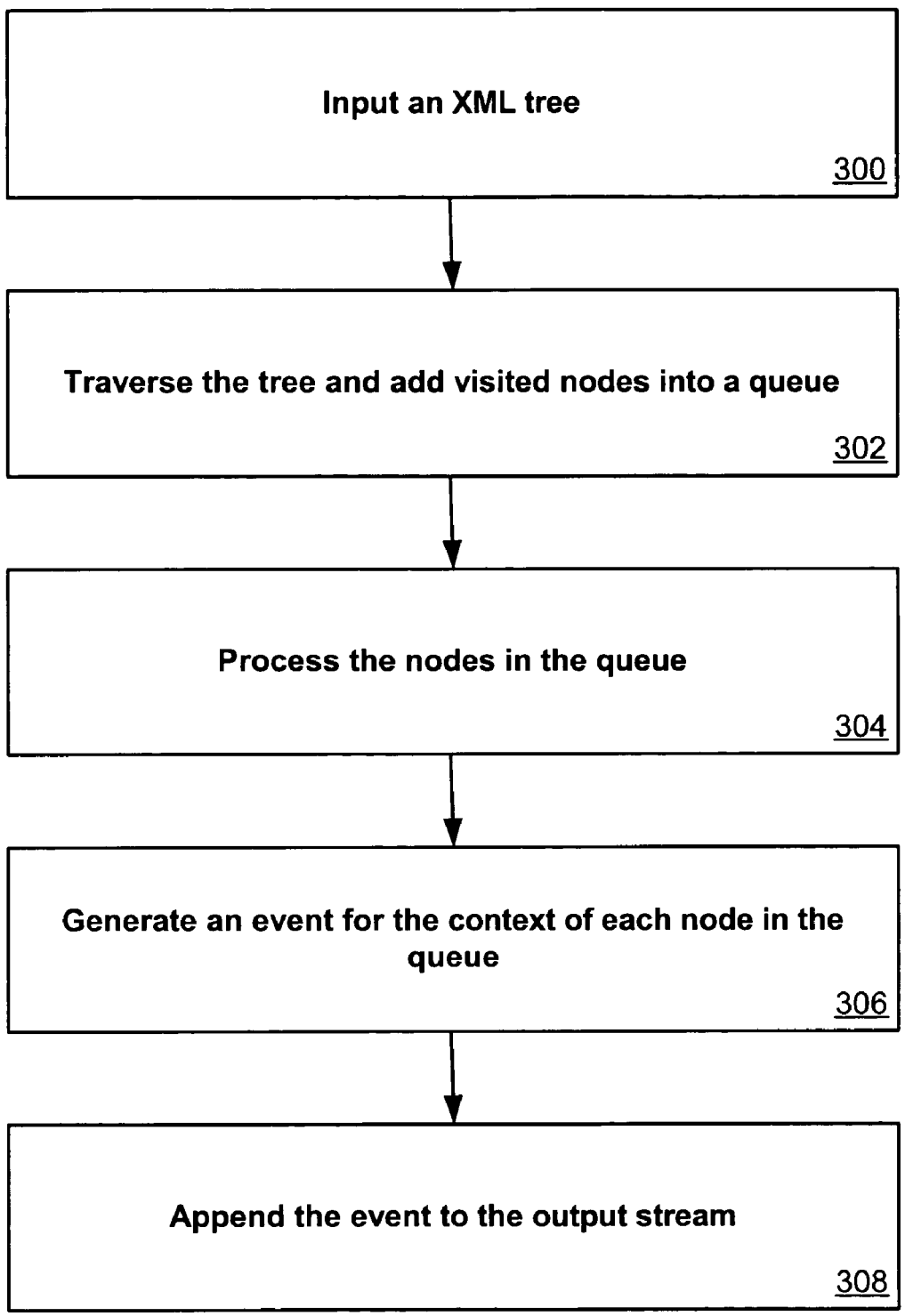
FIG. 3 is a flowchart for an exemplary process that can be used with the system of FIG. 1 in an embodiment.

Systems and methods in accordance with one embodiment do not account for reverse axes. A reverse axis is any axis that would require going "back" through the stream. A diagram showing an exemplary "forward" and "backward" or "reverse" path through a data tree is given by FIG. 2. A diagram of an exemplary system is shown in FIG. 1. A streaming parser 102 generates events by parsing an XML document 100, and then places those events on an XML event stream. Such a streaming process is demonstrated by the diagram of FIG. 3. The streaming parser first takes a tree of an XML document as the input 300, traverses the XML tree either through a broad-first search or a depth-first search and adds each node visited into a data structure, e.g., a queue 302. The streaming parser then processes the queue in the first-in-first-out (FIFO) manner 304 to generate an event for the context of each node in the queue 306 and appends each event to the output stream 308. Using the event stream, the end user of the streaming API pulls events from the stream as they come through it. When a user calls for the next event on the stream, that user has a guarantee that they will get the next event. The user will find out if the next event is going to match, and will find out before the call to next returns.

In one embodiment, an XPath matching component 104 performs matching on each event received on the stream. Matching can be communicated to a caller or end user in a number of ways. These systems are doing event-based processing, as opposed to static tree-based processing. In a tree-based implementation, for example, a user can request all the nodes that match an XPath for a document. The user will receive a collection of nodes that match that XPath. Such an approach is not necessarily effective in the case of streaming, as it is then necessary to read through the document, save all the nodes, and present the collection to the user. This is fundamentally not a stream-centric way of looking at the problem. Instead, using an XPath matching approach, an observer 106 can be registered. The registered observer is an object to be notified whenever an event comes through the stream that matches this Xpath. If an event matches an XPath, that event can be temporarily diverted and sent over to a user-defined object 108 that reacts to the match. Then, the event can be returned to the stream if necessary so that any subsequent object pulling events from the stream can process that event.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented method for processing XML document, comprising:

parsing an XML document to generate a stream of discrete pieces of the XML document;

accepting a discrete piece of the XML document from the stream of discrete pieces and keeping in memory only said discrete piece of the XML document from the stream at any one time;

performing, on one or more microprocessors, a match on said discrete piece of the XML document from the stream and notifying an observer when the discrete piece of the XML document is a matched discrete piece of the XML document, wherein when the discrete piece of the XML document is not a matched discrete piece of the XML document the observer is not notified;

listening for the matched discrete piece of the XML document and passing it to a first user object;

returning said discrete piece of the XML document to the stream; and pulling said discrete piece of the XML document from the stream for the use of a subsequent user object, wherein the subsequent user object handles said discrete piece of the XML document when there is another match.

2. The method according to claim 1, further comprising:
keeping only a portion of the XML document in memory at any given time.

3. The method according to claim 1, further comprising:
representing the XML document in a hierarchical structure, which is a XML tree with each node containing a portion of the document.

4. The method according to claim 3, wherein:
the parsing of the XML document comprises the steps of:
traversing the XML tree and adding visited nodes into a data structure;
processing the nodes in the data structure and generating a discrete piece of the XML document for each node; and
appending the discrete piece of the XML document to the output stream.

5. The method according to claim 4, wherein:
the XML tree is traversed using a breath-first or depth-first search.

6. The method according to claim 4, wherein:
the data structure is processed using a first-in-first-out approach.

7. The method according to claim 3, further comprising:
keeping, cloning and destroying the entirety or a portion of a sub-tree descending from a node in the XML tree.

8. The method according to claim 1, further comprising:
knowing the schema of the XML document and foreseeing the coming events.

9. The method according to claim 1, wherein:
the match is an expression-based match, which uses an XPath query.

10. The method according to claim 1, further comprising:
accepting another discrete piece of the XML document at said time.

11. The method according to claim 1, further comprising:
accepting another discrete piece of the XML document at a different time.

12. A system implemented using a computer to process XML document, comprising:
a streaming parser operable to parse an XML document to generate a stream of discrete pieces of the XML document;
one or more matching components to perform the steps of:
accepting a discrete piece of the XML document from the stream of discrete pieces and keeping in memory only said discrete piece of the XML document from the stream at any one time;

performing a match on said discrete piece of the XML document from the stream and notifying an observer when the discrete piece of the XML document is a matched discrete piece of the XML document, wherein when the discrete piece of the XML document is not a matched discrete piece of the XML document the observer is not notified;

listening for the matched discrete piece of the XML document and passing it to a first user object;

returning said discrete piece of the XML document to the stream; and pulling said discrete piece of the XML document from the stream for the use of a subsequent user object, wherein the subsequent user object handles said discrete piece of the XML document when there is another match.

13. The system according to claim 12, wherein:
the XML document is represented in a hierarchical structure.

14. The system according to claim 13, wherein:
the hierarchical structure is a XML tree with each node containing a portion of the document.

15. The system according to claim 14, wherein:
the streaming parser generates the stream of discrete pieces of the XML document by:
traversing the XML tree and adding visited nodes into a data structure;
processing the nodes in the data structure and generating a discrete piece of the XML document for each node; and
appending the discrete piece of the XML document to the output stream.

16. The system according to claim 15, wherein:
the XML tree is traversed using a breath-first or depth-first search.

17. The system according to claim 15, wherein:
the data structure is a queue.

18. The system according to claim 15, wherein:
the data structure is processed using a first-in-first-out approach.

19. The system according to claim 12, wherein:
the one or more matching components keep only a portion of the XML document in memory at any given time.

20. The system according to claim 12, wherein:
the one or more matching components know the schema of the XML document and operate to foresee coming discrete pieces of the XML document.

21. The system according to claim 12, wherein:
the match is an expression-based match, which uses an XPath query.

22. The system according to claim 12, wherein:
the one or more matching components keep, clone and destroy the entirety or a portion of a sub-tree descending from a node in the XML tree.

23. The system according to claim 12, wherein:
the one or more matching components perform the step of accepting another discrete piece of the XML document at said time.

24. The system according to claim 12, wherein:
the one or more matching components perform the step of accepting another discrete piece of the XML document at a different time.

25. A machine readable storage medium having instructions stored thereon that when executed by a processor to:
parse an XML document to generate a stream of discrete pieces of the XML document;

accept a discrete piece of the XML document from the stream of discrete pieces and keep in memory only said discrete piece of the XML document from the stream at any one time;

perform a match on said discrete piece of the XML document from the stream and notifying an observer when the discrete piece of the XML document is a matched discrete piece of the XML document, wherein when the discrete piece of the XML document is not a matched discrete piece of the XML document the observer is not notified;

listen for the matched discrete piece of the XML document and passing it to a first user object;

return said discrete piece of the XML document to the stream; and pull said discrete piece of the XML document from the stream for the use of a subsequent user object, wherein the subsequent user object handles said discrete piece of the XML document when there is another match.

26. The machine readable medium of claim 25, further comprising instructions that when executed cause the system to:

keep only a portion of the XML document in memory at any given time.

27. The machine readable storage medium of claim 25, further comprising instructions that when executed cause the system to:

know the schema of the XML document and foresee the coming discrete pieces of the XML document.

28. The machine readable storage medium of claim 25, further comprising instructions that when executed cause the system to:

represent the XML document in a hierarchical structure, which is a XML tree with each node containing a portion of the document.

29. The machine readable storage medium of claim 28, wherein:

the parsing of the XML document comprises the steps of:
traversing the XML tree and adding visited nodes into a data structure;
processing the nodes in the data structure and generating a discrete piece of the XML document for each node; and
appending the discrete piece of the XML document to the output stream.

30. The machine readable storage medium of claim 29, wherein:

the XML tree is traversed using a breath-first or depth-first search.

31. The machine readable storage medium of claim 29, wherein:

the data structure is processed using a first-in-first-out approach.

32. The machine readable storage medium of claim 25, wherein:

the match is an expression-based match, which uses an XPath query.

33. The machine readable storage medium of claim 25, further comprising instructions that when executed cause the system to:

keep, clone and destroy the entirety or a portion of the sub-tree descending from a node in the tree.

34. The machine readable storage medium of claim 25, further comprising instructions that when executed cause the system to:

accept another discrete piece of the XML document at said time.

35. The machine readable storage medium of claim 25, further comprising instructions that when executed cause the system to:

accept another discrete piece of the XML document at a different time.

* * * * *

UNITED STATES PATENT AND TRADEMARK OFFICE
CERTIFICATE OF CORRECTION

PATENT NO. : 7,653,636 B2
APPLICATION NO. : 10/780299
DATED : January 26, 2010
INVENTOR(S) : Patrick Calahan It is certified that error appears in the above-identified patent and that said Letters Patent is hereby corrected as shown below:

On the title page, item (56), in column 2, under "U.S. Patent Documents", line 4, delete "2002/1016180" and insert -- 2002/0161801 --, therefor.

On the title page, item (56), in column 2, under "Other Publications", line 1, delete "introduction" and insert -- Introduction --, therefor.

On page 2, in column 1, under "Other Publications", line 6, delete "Reprentation" and insert -- Representation --, therefor.

Signed and Sealed this

Fourteenth Day of September, 2010

David J. Kappos
*Director of the United States Patent and Trademark Office*